United States Patent
Faigle

(10) Patent No.: US 6,834,539 B2
(45) Date of Patent: Dec. 28, 2004

(54) ROTARY MACHINE ELEMENT AND METHOD FOR DETECTING POSITIONAL VALUES OF AT LEAST ONE FUNCTIONAL PART OF SUCH A ROTARY MACHINE ELEMENT

(75) Inventor: Bernd Hans Faigle, Nürtingen (DE)

(73) Assignee: Gebr. Heller Maschinenfabrik GmbH, Nürtingen (DE)

( * ) Notice: Subject to any disclaimer, the term of this patent is extended or adjusted under 35 U.S.C. 154(b) by 0 days.

(21) Appl. No.: 10/065,385

(22) Filed: Oct. 11, 2002

(65) Prior Publication Data

US 2003/0071526 A1 Apr. 17, 2003

(30) Foreign Application Priority Data

Oct. 13, 2001 (DE) .......................................... 101 50 710

(51) Int. Cl.[7] .............................................. B23B 31/30
(52) U.S. Cl. .................................... 73/117.3; 279/4.02
(58) Field of Search .......................... 310/112, 114–122, 310/80, 83, 68 B; 73/116, 117.2, 117.3, 118.1; 279/4.01, 4.02, 126

(56) References Cited

U.S. PATENT DOCUMENTS

| | | | |
|---|---|---|---|
| 3,777,587 A | * | 12/1973 | Hoshina et al. ............ 74/89.23 |
| 4,087,890 A | * | 5/1978 | Ishizuka et al. ............ 59/27 C |
| 4,431,954 A | * | 2/1984 | Carpenter et al. .......... 318/443 |
| 4,521,707 A | * | 6/1985 | Baker ........................... 310/80 |
| 4,799,839 A | * | 1/1989 | Berstein et al. ............ 409/244 |
| 5,027,023 A | * | 6/1991 | Koivikko ..................... 310/83 |
| 6,527,279 B2 | | 3/2003 | Tagland ..................... 279/4.02 |

FOREIGN PATENT DOCUMENTS

DE 199 54 634 5/2001

* cited by examiner

Primary Examiner—Dang Le
(74) Attorney, Agent, or Firm—Gudrun E. Huckett

(57) ABSTRACT

A rotary machine element has at least one functional part performing movements into stop positions, which stop positions are nominal stop positions or mechanical terminal stop positions and are functionally correlated. At least one position sensor is provided for detecting individual actual position values of the stop positions independently from one another. At least one position sensor is located in a control path between the at least one functional part and an NC control. The control path is active in positions between the nominal stop positions; the mechanical terminal stop positions; or the nominal stop positions and the mechanical terminal stop positions. Based on acquired actual position values of the at least one functional part, the speed and acceleration of the at least one functional part are determined by NC-control.

58 Claims, 5 Drawing Sheets

PRIOR ART

ROTARY MACHINE ELEMENT AND METHOD FOR DETECTING POSITIONAL VALUES OF AT LEAST ONE FUNCTIONAL PART OF SUCH A ROTARY MACHINE ELEMENT

BACKGROUND OF INVENTION

1. Field of the Invention

The invention relates to a rotary machine element in which at least one functional part performs movements into nominal stop positions or into mechanical terminal stop positions which are functionally related and whose individual actual position values can be detected independent from one another with at least one position sensor. The invention further relates to a method for detecting position values of at least one functional part of such a rotary machine element.

2. Description of the Related Art

The alignment and clamping of workpieces, in particular, of crankshafts and camshafts, is carried out generally by hydraulically actuated chucks as a rotary machine element. In this connection, the workpiece can be received in a centered or floating arrangement by the chuck. Generally, the chuck comprises, dependent on the workpiece arrangement, several functions which can be carried out during the clamping process usually only in a temporal sequence one after another. Such functions are, for example, centering, clamping, as well as radial, axial, and rotary alignment of the workpiece. These functions are carried out by the corresponding functional parts, such as centering tips, alignment elements, and clamping elements. The functional states are monitored by control functions, for example, recognition of the workpiece type, control whether a workpiece is present or absent, or the like. During the clamping process, mechanical stop positions are conventionally present in the chuck, for example, when the clamping jaws or the centering tip impact on the workpiece. These stop positions are nominal positions which result from the workpiece geometry, for example, the clamping diameter. Further stop positions result when the maximum stroke of the individual chuck functions is reached, dependent on the mechanical chuck configuration, i.e., in the end position of the stroke, respectively. These stop positions are the terminal stop positions.

For controlling the different stop positions the respective mechanical movement of a functional part is coupled conventionally to one or more control rods whose positions are controlled by means of contactless proximity switches in combination with adjusting cams. Since particularly during alignment and clamping of crankshafts and camshafts a plurality of these chuck functions are necessary, numerous such proximity switches are required accordingly. The adjusting expenditure of these terminal proximity switches is high because the switching positions of each individual stop position must be adjusted by the adjusting cams. One proximity switch is thus required for each stop position. They must be adjusted with a relatively high precision. This high adjusting sensitivity, however, can result in faulty messages when vibrations occur, for example, in the case of residual imbalance of a lathe, as a result of machining vibrations on milling machines, or as a result of unavoidable concentricity deviations of the adjusting cams.

A further problem occurs when the stop positions to be controlled are changed as a result of, for example, workpiece dimensions which are not constant or a different type of workpiece. In this situation, the switching positions must be manually corrected or adjusted, which results in a cost-intensive downtime of the machine, maintenance work, repairs, and adjusting work.

A further disadvantage of conventionally employed control devices of a chuck resides in that a safe and reliable course of the functions is carried out serially and therefore is time-intensive with regard to machine cycles. For example, only after checking that the nominal position of a function has been reached, the next function is initiated. With this method it is prevented that, for example, clamping of the workpiece begins already during an accidentally delayed alignment movement. The mechanical position of a chuck function moreover is known to the control device only in those positions where the terminal proximity switches are provided. Intermediate positions between the individual terminal proximity switches are not detected.

Chucks are known tram DE 200 12 080 in which the mechanical position of the piston rod is detected by a control system based on magnetostrictive sensors. The position sensors are used in analogy to terminal proximity switches. i.e., the nominal positions provided during the course of the function or the terminal stop positions are controlled. Additional functions, for example, NC-controlled (NC=numerical control) moving of the chuck functions between the stop positions, measuring, checking, or moving for determining a reference point, are not realized.

Also, a servo device is known (DE 199 54 634) which enables detection of the respective position of the clamping piston by induction. This system is also used only for controlling the nominal positions or the terminal stop positions.

SUMMARY OF INVENTION

It is an object of the present invention to configure the rotary machine element of the aforementioned kind and the method of the aforementioned kind such that in a constructively simple way the functional part can be monitored with high precision.

In accordance with the present invention, this is achieved in regard to the rotary machine element in that the position sensor is located within a control and/or regulating path between the functional part and an NC-control which path is active in positions between the nominal stop positions and/or the mechanical terminal stop positions.

In accordance with the present invention, this is furthermore achieved in regard to the method in that the actual position values of the functional parts are detected and, based thereon, the speed and acceleration of the functional parts is determined by means of the NC-control.

The rotary machine element according to the invention is characterized in that the position sensor is located in a control and/or regulating path between the functional part and the NC-control. The control and/or regulating path (for short "control path") is active in positions between the nominal stop positions and/or the mechanical terminal stop positions. The position sensor enables efficient diagnostic methods particularly in the nominal position or in the mechanical terminal stop position. Procedures for a simplified detection or determination of the nominal position, also referred to as reference point methods, are enabled by the position sensor. The control and regulating function is enabled by a continuous and highly precise measurement of the actual position of the functional part.

The determination of the actual position value of the functional part enables with high precision the determination of speed and acceleration. Also, travel distances, speeds, and accelerations for the functional part can be defined. When the rotary machine element has several functional parts, the travel distances, speeds, and accelerations can be defined for each functional part individually.

The movements of the individual functional parts which are functionally correlated with one another are carried out in a precise relation to one another. The travel distances, speeds, and accelerations for each functional part are advantageously programmed, processed, and saved in data processing devices (computer) or in numerical control devices (NC-devices).

By employing the position sensor and by employing corresponding software programs and data processing devices (computers), these functions can be measured, checked, monitored, and controlled, and combinations of these tasks can be carried out. Processing of data and transmission of required information to peripheral devices is carried out advantageously by software.

The measuring of the actual position values by means of the position sensor is advantageously a length measurement. In this case, the respective functional part of the machine element according to the invention performs an axial movement which is detected by the position sensor.

It is also possible that the measurement of the actual position values by means of the position sensor is an angular position measurement. In this case, the angular position of the respective functional part is detected by the position sensor.

Advantageously, the position sensor operates based on the measuring principle of magnetostriction. For this purpose, one or several position sensors as well as one or several position transducers measure (acquire) the actual position values of one or several functional parts. The measurement of angular positions can be realized with this measuring principle by a grooved component which is positioned on the axis of rotation (rotary axis) of the rotary machine element and, when rotated, affects the magnetic field and in this way enables a precise correlation of the angular position relative to the position sensor.

When the rotating machine element is a chuck, it is possible to clamp one or several workpiece types with a different geometry, respectively, in a simple and reliable way. The respective course of movement of the functional parts of the chuck, such as a centering tip, alignment elements, and clamping elements, are processed and saved by NC-programs.

In this connection, the measuring and checking functions can relate to the clamping diameter and workpiece length, optionally also to additional workpiece features.

When the rotary machine element is a workpiece carrier for receiving a workpiece, the measuring function of the workpiece carrier can be used advantageously for an automatic recognition of a workpiece type. This recognition of the workpiece type is used advantageously for automatic recognition of different types of workpieces which reach the production process in a random sequence.

The measuring, checking, monitoring, and control functions are advantageously carried out for an automated recognition of deviations from a predetermined movement course of the clamping process, for example, a workpiece not being present or similar events.

Also, the measuring, checking, monitoring, and control functions can be employed for automatic recognition of impermissible workpiece movements during the machining process, for example, sliding of the workpiece in the chuck as a result of great machining forces. In this case, the position sensor also detects a corresponding sliding movement of the functional part.

When such an impermissible workpiece movement occurs, an adaptive regulation of the chuck functions, machining functions or the like is advantageously carried out, for example, an increase of the clamping force or a reduction of the feeding speed. In this way, an immediate response to such impermissible workpiece movements during the machining process can be carried out so that damage of the workpiece and/or of the tool is reliably prevented.

The measuring function of a clamping chuck can be employed advantageously for a corrective function of parameters within the NC-programs. Such a corrective function can be used, for example, for automatic recognition of the axial or radial length of the workpiece within the chuck or the like.

It is particularly advantageous when the nominal position values have tolerances correlated therewith. When the actual values surpass or drop below these tolerances, the monitoring and control function is activated.

The nominal position values of the function parts required for the respective tool or workpiece are determined by means of a reference movement course by employing a reference workpiece.

It is also possible to preset the nominal position values of the functional parts by programming.

When one or several sensors are exchanged, the rotary machine element is calibrated by performing a reference movement course.

In the same way, the rotary machine element is calibrated by a reference movement course when one or several position transducers are exchanged.

DETAILED DESCRIPTION

Figure 1:
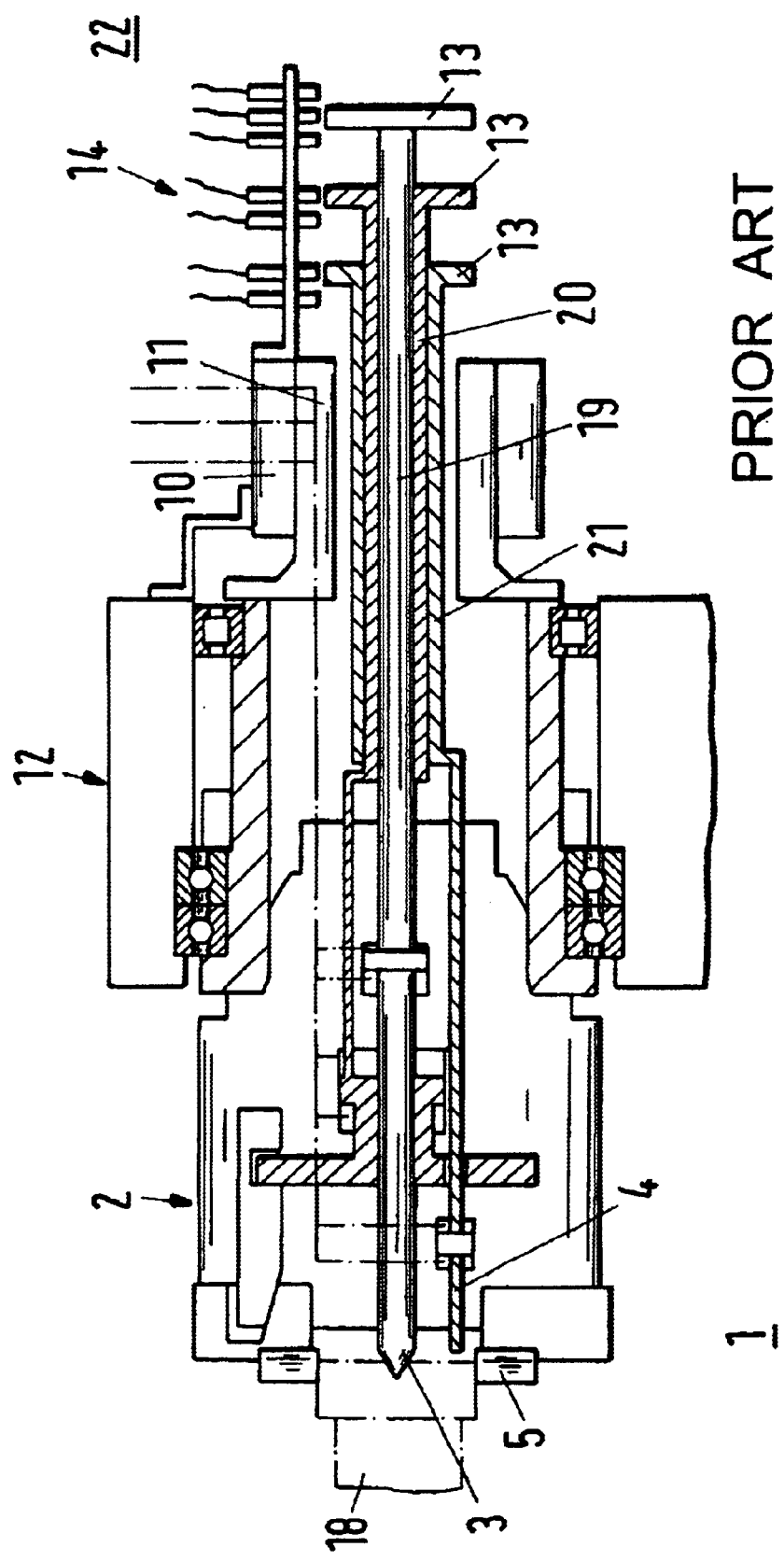
FIG. 1 shows a rotary machine element according to the prior art in axial section.

FIG. 1 shows a rotary machine element 1 in the form of a chuck 2. It comprises clamping elements 5, alignment elements 4 as well as a lathe center 3. Since such a clamping chuck 2 is known generally to a person skilled in the art, it will not be explained in more detail in this connection. By means of the clamping elements 5, a workpiece 18 is clamped within the chuck 2 and centered by means of the lathe center 3. The workpiece can be, for example, a crankshaft or a camshaft. The clamping elements 5 can be moved radially. The lathe center 3 is moved with a shaft 19 in the axial direction. It is guided in a clamping sleeve 20 with which, as is known to a person skilled in the art, the clamping jaws 5 can be moved radially in order to clamp or release the workpiece 18. An actuator sleeve 21 is movably supported on the clamping sleeve 20; the workpiece 18 can be moved, as is known to a person skilled in the art, by the actuator sleeve 21 via the alignment elements 4 into the required angular position within the chuck 2. The lathe center 3, the alignment elements 4, and the clamping elements 5 are moved, as is known in the art, independently from one another.

In order to be able to clamp the workpiece 18 reliably, the shaft 19, the clamping sleeve 20, and the actuator sleeve 21 are provided at their free ends with an adjusting cam, respectively. They are part of a length measuring system 22 with which the axial movement paths of the shaft 19, the clamping sleeve 20, and the actuator sleeve 21 are detected.

The chuck 2 is hydraulically actuated. As is well known in the art, the hydraulic medium is supplied by a distributer 10 and a rotary passage 11.

During clamping, the workpiece 18 to be clamped is first centered by the lathe center 3 for which purpose the shaft 19 is correspondingly moved. Subsequently, the workpiece 18 is aligned in the chuck 2 in the required angular position. For this purpose, the alignment elements 4 are provided which are axially moved by the actuator sleeve 21 by the required amount and enable a radial movement by means of a mechanism that is not illustrated. Finally, the workpiece 18 is clamped by the clamping elements 5 as is known in the art. When doing so, the clamping sleeve 20 is moved in the axial direction of the clamping chuck 2.

The adjusting cams 13 have correlated therewith one or several position switches 14 wherein for each nominal position of the shaft 19, of the clamping sleeve 20, and of the actuator sleeve 21 a separate position switch 14 is provided. The position switches 14 are contactless proximity switches which cooperate with the adjusting cams 13 in a way known to a person skilled in the art. Since particularly upon alignment and clamping of crankshafts and camshafts a plurality of chuck functions are required, a correspondingly large number of position switches 14 is thus necessary. Since the switching positions of each individual stop position must be adjusted by the adjusting cams 13, a high adjusting expenditure is required. For each individual stop position one proximity switch 14 is required. The position switch 14 must be adjusted with very high precision. However, when machining on the machine, vibrations occur, for example, in the case of residual imbalance of a lathe, as a result of machining vibrations on milling machines, or as a result of unavoidable concentricity deviations. As a result of the high adjustment sensitivity of the position switches 14, these disruptions result in indication errors. When the stop positions to be controlled change, for example, because of workpiece dimensions that are not constant or because of a different workpiece type to be clamped within the chuck 2, the switching positions must be manually corrected or adjusted. This results in cost-intensive downtimes of the machines, maintenance labor, repairs, and adjusting work.

The safe functional performance of the clamping action is carried out generally serially and accordingly time-intensive with regard to machine cycles. Only after checking that the nominal position has been reached for one function, the next function is initiated. This prevents that, for example, the workpiece clamping action begins already during an accidentally delayed alignment movement. However, the mechanical position of the clamping function is known to the control only in those positions in which also the position switches 14 are provided. Intermediate positions cannot be recognized.

Figure 2:
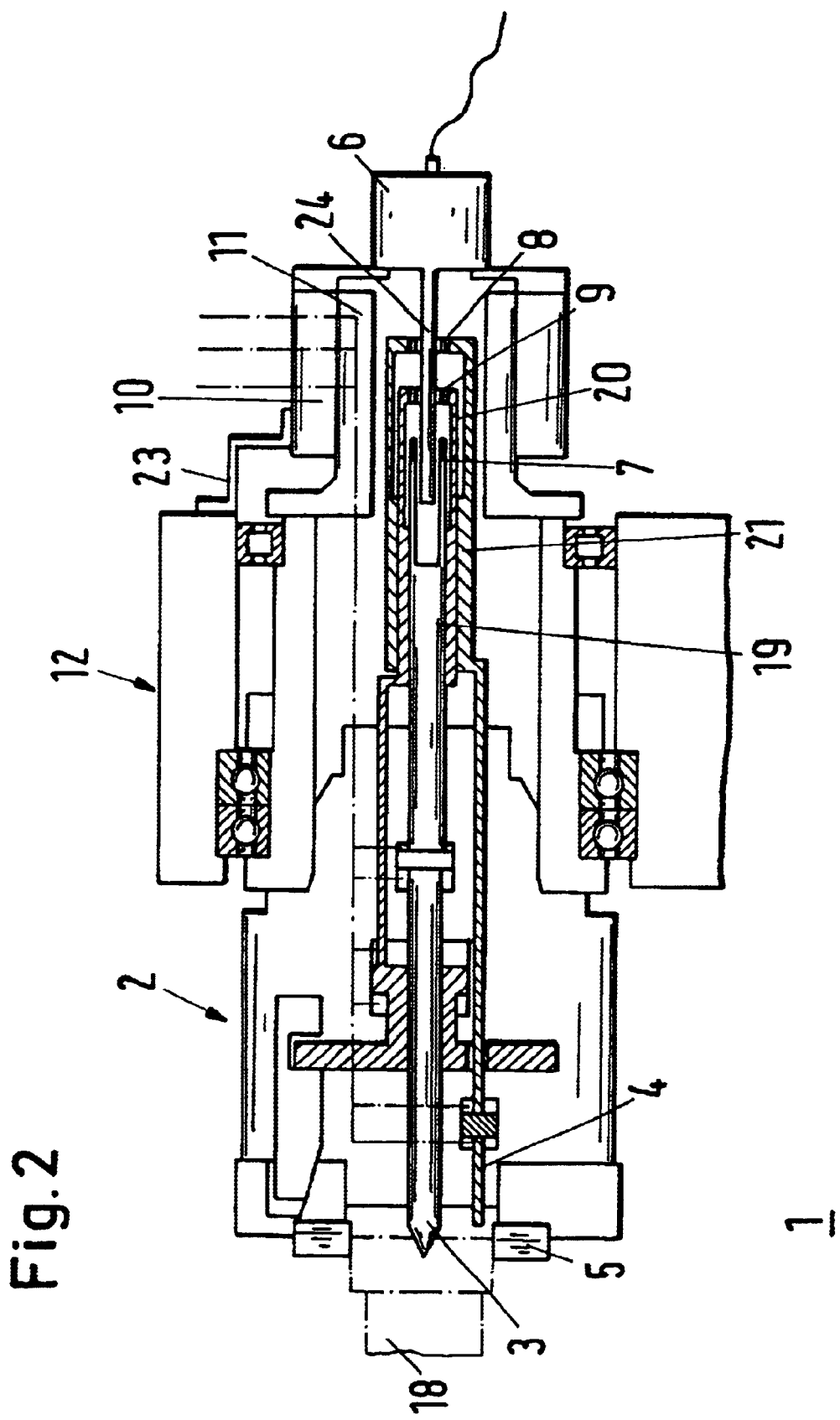
FIG. 2 shows an axial section of a first embodiment of the rotary machine element according to the intention which rotary machine element is in the form of a chuck.

In order to avoid these disadvantages, a first embodiment of the rotary machine element 1 is configured according to FIG. 2. The machine element is formed as a chuck 2 whose movements are detected by a linear absolute length measuring system which in the illustrated embodiment functions based on the magnetostrictive effect. The length measuring system of FIG. 2 has a magnetostrictive position sensor 6 and position transducers 7 to 9. The magnetostrictive position sensor 6 is fixedly connected with the radially stationary oil distributer 10 which supplies the chuck 2 with hydraulic energy for actuating the different movements of the chuck 2. The oil distributer 10 is decoupled by the rotary passage 11 from the rotary movement of the chuck 2. Advantageously, the oil distributer 10 is located outside of the spindle 12 in order to ensure a simple accessibility in case of maintenance. The oil distributer 10 is fastened with fastening elements 23 on an end face of the spindle 12.

The position sensor 6 can be embodied according to other measuring principles known in the art; examples are laser technology, optics (optical systems), ultrasound, or the like.

The position sensor 6 is arranged coaxially to the rotary axis of the chuck 2. The position sensor 6 has a rod-shaped projection 24 positioned on the rotary axis of the chuck 2 and surrounded by the position transducers 7 to 9. They are positioned coaxially relative to the clamping chuck 2 and are connected mechanically fixedly with the components 19, 20, and 21 of the chuck 2, respectively. The position transducer 7 moves proportionally to the movement of the lathe center 3 and is provided at the free end of the shaft 19 of the lathe center 3. The position transducer 8 moves proportionally to the movement of the alignment elements 4 and is provided on the free end of the actuator sleeve 21 of the alignment elements 4. The position transducer 9 moves proportionally to the clamping elements 5 and is arranged at the free end of the clamping sleeve 20. In this way, the movements of the individual clamping chuck components 3 to 5 are transmitted mechanically directly onto the position transducers 7 to 9 which move relative to the stationery position sensor 6. Since the position transducers 7 to 9 are connected mechanically directly to the moving elements 19, 20, 21 of the clamping chuck parts 3 to 5, the position transducers 7 to 9 indicate or represent with very high security the functional state of the individual clamping chuck functions of the clamping chuck 2. Moreover, this provides a very high measuring precision. Since the position transducers 7 to 9, which are advantageously formed as rings, move along the rod-shaped projection 24 of the position sensor 6, each position of the lathe center 3, of the alignment elements 4, and of the clamping elements 5 is detected. Moreover, an adjustment of the position sensor in regard to a respective application is not required. The projection 24 of the position sensor 6 has such a length that the position transducers 7 to 9 in any adjusted position of the chuck elements 3 to 5 surround this projection 24 and generate corresponding signals.

Figure 3:
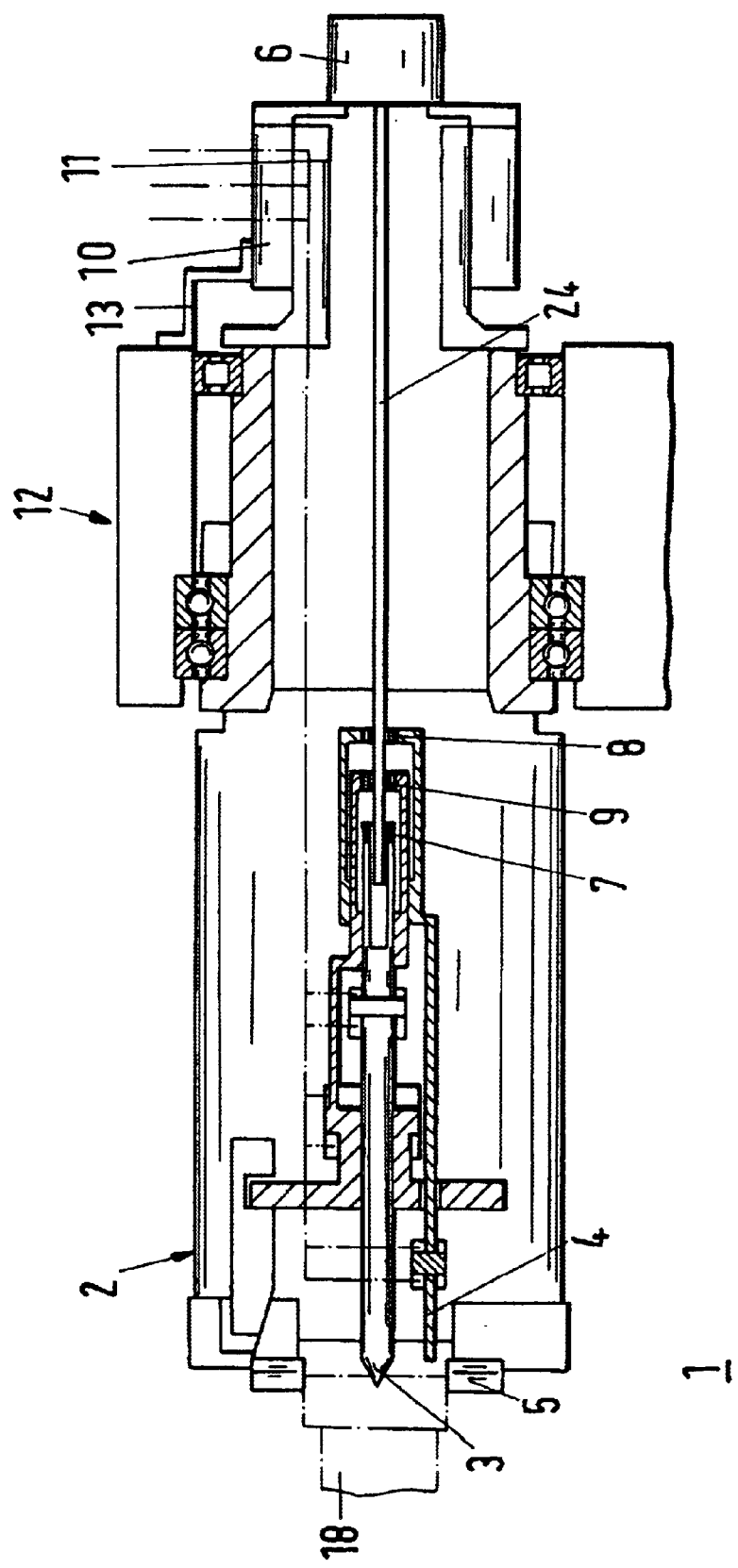
FIG. 3 is an axial section of a second embodiment of the rotary machine element according to the intention.

In the embodiment according to FIG. 3, the position sensor 6 and the position transducers 7 to 9 are arranged directly within the clamping chuck 2 while in the preceding embodiment they were positioned outside of the clamping chuck. The projection 24 of the position sensor 6 is significantly longer than that of the preceding embodiment because it must extend through the spindle 12. In other respects, this rotary machine element 1 in the form of the chuck 2 is identical to the preceding embodiment. The position sensor 6 is fastened on the oil distributer 10 which, in turn, is connected by the adjusting element 13 with the spindle 12. Since the position transducers 7 to 9 and the position sensor 6 are arranged in the clamping chuck 2, it is correspondingly longer than the chuck according to FIG. 2. For removing the chuck 2, for example, in the case of a repair being required, the position sensor 6 and the position transducers 7 to 9 must not be demounted.

In the method according to the invention, particularly in the positions between the nominal position values and/or the mechanical terminal stop positions, control and regulating-technological methods are used. Parameters such as the travel distance, course of movement, speed, and acceleration can be defined in a targeted way for each clamping chuck function individually by means of an NC-program. Moreover, in comparison to the know methods, a plurality of advantages and new application possibilities are provided.

A significant advantage is the reduction of the duration for the complete clamping process. In the known methods, it is necessary to have a serial course of the individual clamping chuck functions. In the chuck according to FIGS. 2 and 3, different clamping chuck movements can be performed parallel to one another, when possible and sensible with regard to kinematic and clamping technological aspects.

In the general clamping technology it is known that the dynamics of a clamping or alignment movement has a significant effect on the clamping and alignment quality of the clamping chuck 2 and thus onto the machining result. As a result of the possibility of control or regulating provided in the clamping chuck according to FIGS. 2 and 3, for example, the speed of the lathe center 3 can be reduced before reaching the nominal position values and, in this way, possible tension or stress on the workpiece can be prevented.

In practice, the task of clamping workpiece types of different geometry with the chuck 2 is often encountered. For each workpiece type an individual movement course is required. For this purpose, according to the known methods, when employing the chuck according to FIG. 1, the adjusting cams 13 of the position switches 14 must be precisely adjusted for each clamping chuck function in a time-consuming, cumbersome procedure. These adjustments must be carried out even when a workpiece type which has already been machined before is clamped again. When employing the clamping chuck according to FIGS. 2 and 3 for different types of workpieces, the required movement courses of the clamping chuck 2 can be advantageously programmed. The programs can be saved in the data storage device of the NC-control and can be used as needed.

Wide dispersions of the workpiece clamping diameter cause functional disturbances in the known methods and require manual corrections of the adjusting cams 13 of the position switches 14. When employing the magnetostriction method according to FIGS. 2 and 3, tolerances can be defined for the nominal position values which cover the usual dispersions of the clamping diameter. When the actual values surpass or drop below the tolerances, a diagnostic error software can detect actual functional disruptions, for example, that the workpiece 18 is missing, so that the process safety is increased.

Programming of the movement course of the components 3 to 5 of the clamping chuck 2 can be manually performed by a single detection and saving action of the nominal position values, for example, by means of a reference movement course and a reference workpiece. As an alternative, the movement course can also be programmed without a workpiece 18 in that the corresponding nominal position values are provided within the program flow. The movement range of the clamping chuck elements 3 to 5 is detected by a reference movement course and without a workpiece.

A further advantage when employing the magnetostriction method is the simple exchange of the position sensor 6 in the case of repair. In order to calibrate the clamping chuck 2, it is sufficient to perform a reference movement course of the clamping chuck functions. The adjustments of the adjusting cams of the position switches 14 necessary in the known methods are not required in the method of the present invention.

The length measuring system is also well-suited to perform measurements of the workpiece geometry in combination with the diagnostic functions. For example, the length position of the workpiece 18 can be measured, can effect a corresponding correction within the NC-program by means of the evaluation of the lathe center 3 in the clamping position that is reached, and in this way can replace external measuring devices that may be required according to prior art devices and methods.

A further application is a so-called chaotic processing in which different workpiece types are supplied in random sequence for machining on the machine. The possibility of measuring the clamping diameter by means of the clamping chuck 2 via the length measuring system 22, based on the measured result a correlation to the respective workpiece type can be carried out and the corresponding NC-program can be automatically activated. This application can be used also for measuring results derived at the lathe center 3.

Figure 4:
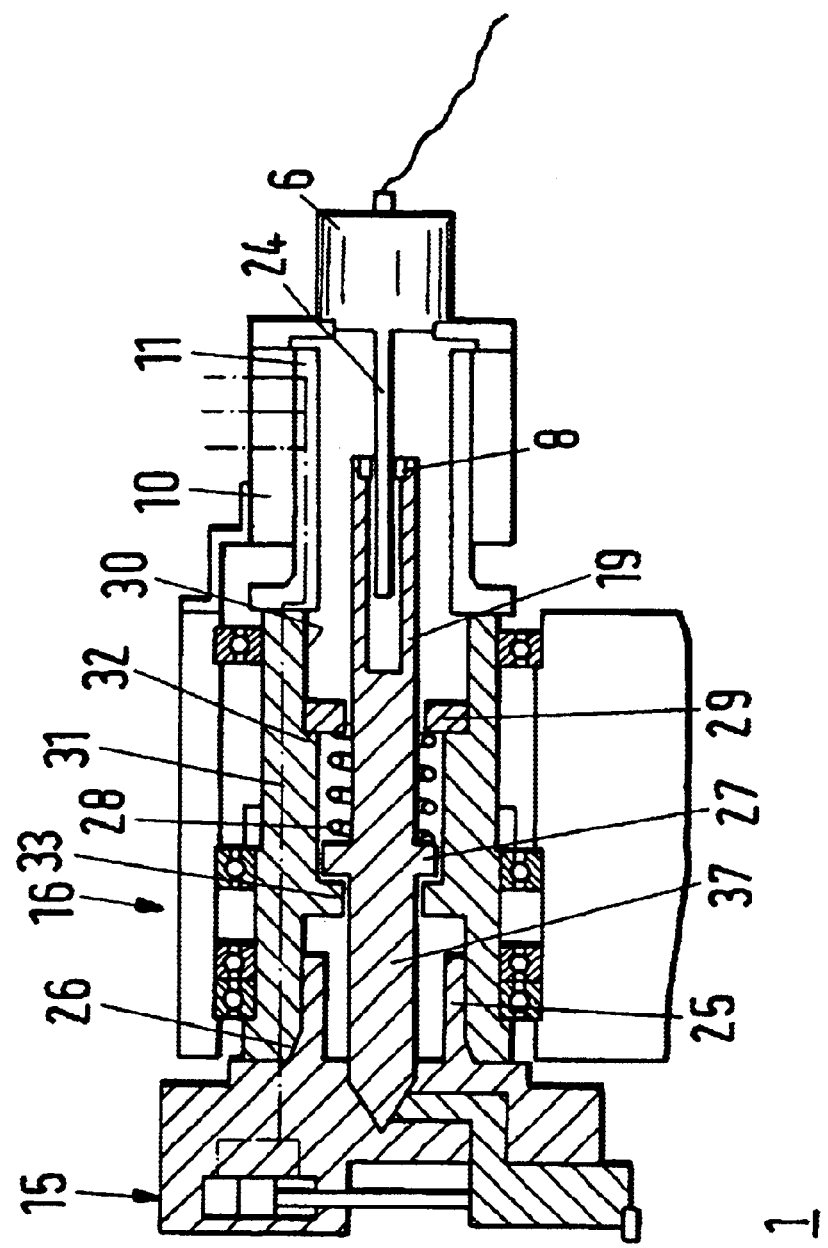
FIG. 4 shows an axial section of a radial facing slide tool.

FIG. 4 shows a workpiece carrier 15 which is embodied in particular as a radial facing slide tool or as a drill rod. The workpiece carrier 15 has a cone 25 with which it is clamped in the clamping receptacle 26 in the work spindle 16, as is known in the art. The work spindle 16 has a slide 37 whose extended shaft 19 has the annular position transducers 8 which surrounds the projection 24 of the position sensor 6. The slide 37 has within the work spindle 16 a radial flange 27 on which one end of a pressure spring 28 surrounding the shaft 19 is supported. The other end of the pressure spring 28 is supported on a stop ring 29 which rests peripherally against the inner wall 30 of a spindle sleeve 31 and also on a radially inwardly directed shoulder surface 32 in the inner wall 30 of the spindle sleeve 31. On the side of the flange 27 facing away from the stop ring 29 the spindle sleeve 31 is provided with a radially inwardly oriented flange 33 which is in the movement path of the flange 27 of the shaft 19 of the slide 37 and provides a terminal stop for the slide. The function of the tool carrier 15 and of the work spindle 16 is known in the art and is therefore not explained in detail in this connection. In correlation with the travel distance of the slide 37, the position transducers 8 moves relative to the projection 24 of the position sensor 6. In this way, the position of the slide 37 can be detected reliably and with high precision.

The aforementioned diagnostic functions, such as measuring, checking, monitoring, and controlling as well as additional functions can be realized with such tool carriers 15.

Figure 5:
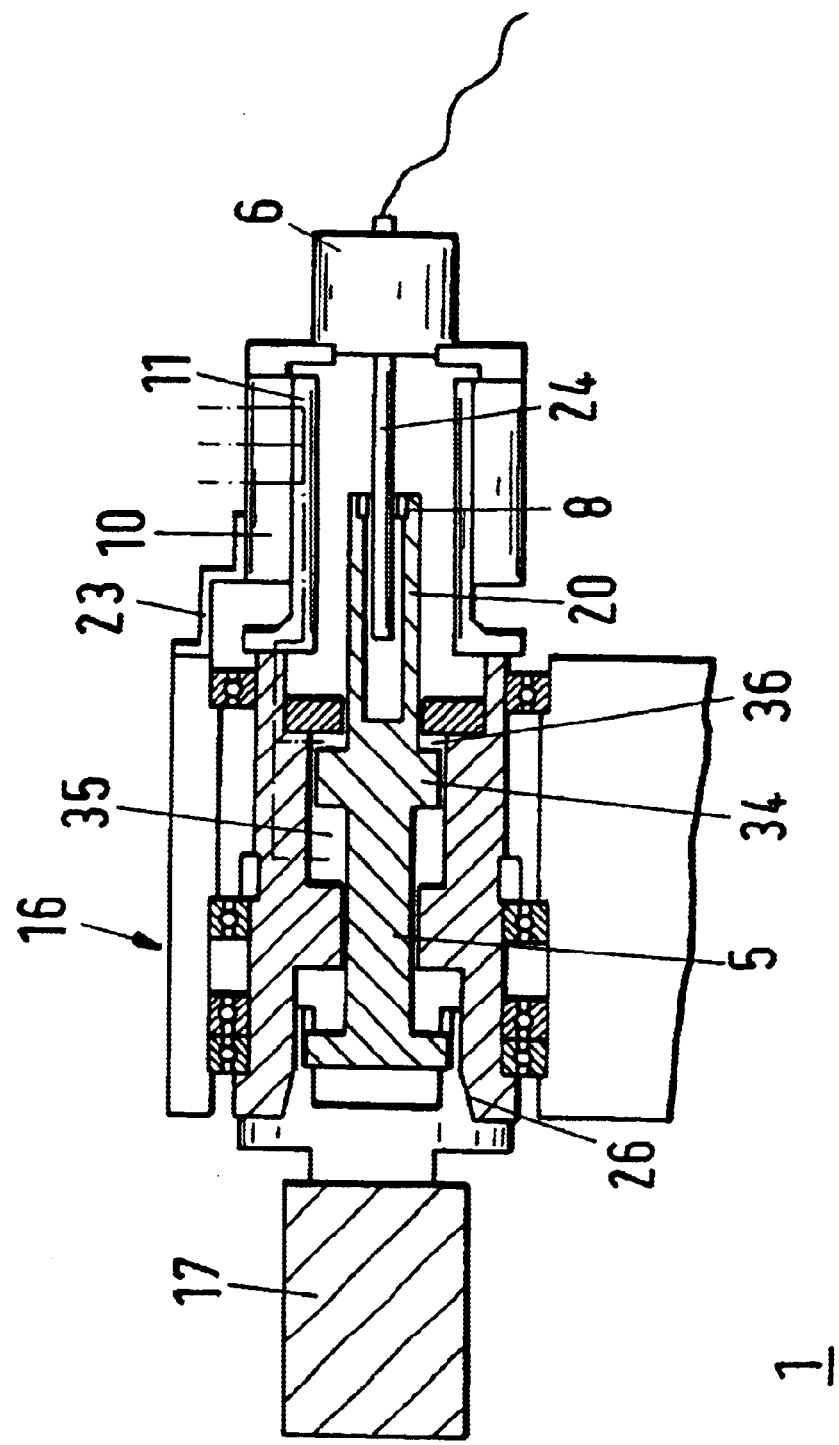
FIG. 5 an axial section of a work spindle with clamped tool.

FIG. 5 shows as a rotary machine element 1 a work spindle 16 of a machine tool in which the measuring system for monitoring the correct clamping position of a tool 17 in the spindle is used. The spindle 2 has a clamping receptacle 26 in which the tool 17 is clamped in a way known in the art. The position sensor 6 according to the embodiments of FIGS. 2 to 4 is attached to the oil distributer 10 which, in turn, is fastened via the fastening elements 23 on the work spindle 16. The position sensor 6 comprises the rod-shaped projection 24 which, in accordance with the preceding embodiments, is positioned on the axis of the work spindle 16 and projects through the oil distributer 10 as well as the rotary passage 11. The projection 24 is surrounded by the position transducer 8 which is mechanically fixedly connected to the clamping element 5 with which the workpiece 17 is clamped in the work spindle 16 in a way known in the art. The clamping element 5 is moveable axially in the work spindle 16 and has a piston 24 which separates two pressure chambers 35, 36 from one another. The hydraulic medium is supplied into the pressure chambers 35, 36 via the oil distributer 10 and the rotary passage 11 in order to load the piston 34 for clamping or releasing the tool 17. Since the position transducer 8 is connected directly mechanically with the clamping element 5, the position sensor 6 can detect the position of the position transducer 8 and thus also the position of the clamping element 5 in a reliable way and with high precision. In this way it is ensured that the tool 17 is clamped perfectly in the work spindle 16.

The described length measuring system 22 has been described above by means of clamping chucks and tools in an exemplary fashion. This method can also be employed in other embodiments, for example, in the case of Kaplan water turbines, stranding machines, or machine tools. In the case of machine tools, particularly workpiece carriers or tool carriers, for example, chucks, tool turrets (driven tools), drum turrets, radial facing slides, or controlled drill rods, can be employed.

While specific embodiments of the invention have been shown and described in detail to illustrate the inventive principles, it will be understood that the invention may be embodied otherwise without departing from such principles.

What is claimed is:

1. A rotary machine element for chucking workpieces or tools, the rotary machine element comprising:
   at least one functional part adapted to perform at least one of clamping, aligning and centering of a workpiece or a tool and to perform movements into stop positions correlated with at least one of clamping, aligning and centering of a workpiece, which stop positions are nominal stop positions or mechanical terminal stop positions and are functionally correlated;
   at least one position sensor configured to detect individual actual position values of the stop positions independently from one another;
   wherein the at least one position sensor is located in a control path between the at least one functional part and a numerical control-based control;
   wherein the control path is active in positions between the nominal stop positions; the mechanical terminal stop positions; or the nominal stop positions and the mechanical terminal stop positions.

2. The rotary machine element according to claim 1, comprising means for actuating the at least one functional part, wherein the means for actuating is a hydraulic drive means, a pneumatic drive means, a mechanical drive means, or an electromechanical drive means.

3. The rotary machine element according to claim 2, comprising a distributer configured to supply a hydraulic medium for actuating the at least one functional part by the hydraulic drive means.

4. The rotary machine element according to claim 3, comprising a rotary passage, wherein the distributor is connected to the rotary passage.

5. The rotary machine element according to claim 1, wherein the at least one position sensor is stationary.

6. The rotary machine element according to claim 3, wherein the at least one position sensor is stationary and fastened on the distributor.

7. The rotary machine element according to claim 1, wherein the at least one position sensor has a projection positioned on a rotary axis of the rotary machine element.

8. The rotary machine element according to claim 7, wherein the at least one position sensor functions based on laser technology, optics, ultrasound, or magnetostriction.

9. The rotary machine element according to claim 7, wherein the at least one position sensor is positioned coaxially to the rotary axis of the rotary machine element.

10. The rotary machine element according to claim 7, wherein the at least one function part has at least one position transducer configured to cooperate with the at least one position sensor.

11. The rotary machine element according to claim 10, wherein the at least one position transducer is annular and surrounds the projection.

12. The rotary machine element according to claim 1, wherein the at least one function part moves relative to the at least one position sensor.

13. The rotary machine element according to claim 1, comprising several of the functional parts, wherein the functional parts are movable independently from one another.

14. The rotary machine element according to claim 13, wherein the functional parts are provided with a position transducer, respectively.

15. The rotary machine element according to claim 14, wherein the position transducer is fixedly connected to the functional parts, respectively.

16. The rotary machine element according to claim 14, wherein the position transducer cooperates with a single one of the at least one position sensor.

17. The rotary machine element according to claim 14, wherein the position transducer is movable relative to the at least one position sensor.

18. The rotary machine element according to claim 14, wherein several of the at least one position sensor are provided.

19. The rotary machine element according to claim 18, wherein the position sensors are arranged concentrically to an axis of the position transducers.

20. The rotary machine element according to claim 18, wherein the position sensors are arranged parallel to a rotary axis of the rotating machine element.

21. The rotary machine element according to claim 14, wherein the at least one position sensor is moveable relative to the position transducer.

22. The rotary machine element according to claim 14, wherein the position transducer is movable proportionally to the functional support parts, respectively.

23. The rotary machine element according to claim 22, wherein the rotary machine element is a workpiece carrier configured to receive a workpiece (18).

24. The rotary machine element according to claim 23, wherein the workpiece carrier is a chuck.

25. The rotary machine element according to claim 24, wherein the chuck comprises a centering tip, alignment elements, checking elements, and clamping elements as the functional parts.

26. The rotary machine element according to claim 1, wherein the rotary machine element is a tool carrier configured to receive a tool (17).

27. The rotary machine element according to claim 26, wherein the tool carrier is a radial facing slide tool.

28. The rotary machine element according to claim 26, wherein the tool carrier is a bore rod.

29. The rotary machine element according to claim 28, wherein the bore rod has at least one radially adjustable cutting edge for producing a bore.

30. The rotary machine element according to claim 1, wherein the rotary machine element is a work spindle of a machine tool configured to receive a tool (17).

31. The rotary machine element according to claim 30, wherein the at least one position sensor is arranged in the work spindle for monitoring a correct clamping position of the tool.

32. The rotary machine element according to claim 1, wherein the nominal stop positions are mechanical stop positions determined by a geometry of a workpiece to be received in the rotary machine element.

33. The rotary machine element according to claim 1, wherein the nominal stop positions are positions without mechanical stop.

34. The rotary machine element according to claim 1, wherein the at least one position sensor in the nominal stop positions or in the mechanical terminal stop positions is used for reference point determination or diagnostics.

35. A method for detecting position values of at least one functional part of a rotating machine element for chucking workpieces or tools, the rotating machine element comprising at least one functional part adapted to perform at least one of clamping, aligning and centering of a workpiece or a tool and to perform movements into stop positions correlated with at least one of clamping, aligning and centering of a workpiece, which stop positions are nominal stop positions or mechanical terminal stop positions and are functionally correlated; at least one position sensor configured to detect individual actual position values of the stop positions independently from one another; wherein the at least one position sensor is located in a control path between the at least one functional part and numerical control-base control; wherein the control path is active in positions between the nominal stop positions; the mechanical terminal stop positions; or the nominal stop positions and the mechanical terminal stop positions; the method comprising the steps of:

acquiring actual position values of the at least one functional part; and based on the actual position values, determining the speed and acceleration of the at least one functional part by means of a numerical control-based control.

36. The method according to claim 35, wherein, in the step of determining, a travel distance, the speed, and the acceleration are individually determined for each one of the functional parts and processed in a control loop.

37. The method according to claim 35, further comprising the step of carrying out movements of the functional parts, which movements are functionally correlated to one another, in exact relation to one another.

38. The method according to claim 35, wherein the travel distances, the speeds, and the accelerations of the functional part are programmed, processed, and saved in data processing devices or in numerical control devices.

39. The method according to claim 35, further comprising the steps of providing a software program and data processing devices, wherein the at least one position sensor in combination with the software programs and the data processing devices enables functions of measuring, checking, monitoring, and controlling as well as combinations of the functions.

40. The method according to claim 39, wherein data generated by the at least one position sensor are processed and required information is transmitted to peripheral devices.

41. The method according to claim 39, wherein the measuring and checking steps relate to at least one of a clamping diameter, a workpiece length, and additional workpiece features.

42. The method according to claim 39, wherein the measuring step is used for automatic workpiece type detection.

43. The method according to claim 42, wherein the workpiece type detection is used for automatic recognition of different workpiece types which are supplied in a random sequence for machining.

44. The method according to claim 39, wherein the functions of measuring, checking, monitoring, and controlling are used for automatic detection of deviations of predetermined movement courses of the clamping process, including detection of a workpiece being absent.

45. The method according to claim 39, wherein the functions of measuring, checking, monitoring, and controlling are used for automatic recognition of impermissible workpiece movements during machining, including sliding of the workpiece (18) in a chuck as a result of high machining forces.

46. The method according to claim 45, wherein the automated detection of impermissible workpiece movements effects an adaptive control of a clamping action of the chuck and of a machining action being performed, wherein an increase or reduction of the clamping force and the feeding speed is carried out.

47. The method according to claim 39, wherein the function of measuring of the chuck is used as a corrective function for parameters of the numerical control program.

48. The method according to claim 47, wherein the corrective function is used for recognition of axial or radial positions of the workpiece in the workpiece carrier.

49. The method according to claim 35, wherein, in the step of acquiring the actual position values, a length measurement is carried out by the at least one position sensor.

50. The method according to claim 35, wherein, in the step of acquiring the actual position values, an angular position measurement is carried out by the at least one position sensor.

51. The method according to claim 35, wherein the at least one position sensor operates by magnetostriction, wherein the at least one position sensor and at least one position transducer acquire the actual position values of the at least one functional support.

52. The method according to claim 35, wherein with the rotary machine element is a workpiece carrier embodied as a chuck, wherein the chuck is configured to clamp at least one workpiece type with different geometries.

53. The method according to claim 52, further comprising the step of controlling a movement course during clamping of the workpiece type by a numerical control program and processing and saving the movement course by data processing devices.

54. The method according to claim 35, wherein nominal position values having correlated tolerances are provided, wherein the function of controlling is activated when the actual values surpass or drop below the nominal position values having correlated tolerances.

55. The method according to claim 35, wherein the nominal position values of the at least one function part are determined by carrying out a reference movement course with a reference workpiece.

56. The method according to claim 35, wherein the nominal position values of the at least one function part are predetermined by programming.

57. The method according to claim 35, wherein the rotary machine element after exchange of at least one position sensor is calibrated by a reference movement course.

58. The method according to claim 35, wherein the rotary machine element after exchange of at least one position transducer is calibrated by a reference movement course.

* * * * *